US012355726B2

(12) United States Patent
Smith et al.

(10) Patent No.: US 12,355,726 B2
(45) Date of Patent: *Jul. 8, 2025

(54) SYSTEMS AND METHODS FOR PROVIDING ENHANCED SECURITY IN EDGE COMPUTING ENVIRONMENTS

(71) Applicant: Level 3 Communications, LLC, Denver, CO (US)

(72) Inventors: Christopher Smith, Broomfield, CO (US); Michael Benjamin, Broomfield, CO (US); Peter Brecl, Highlands Ranch, CO (US)

(73) Assignee: Level 3 Communications, LLC, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/755,276

(22) Filed: Jun. 26, 2024

(65) Prior Publication Data
US 2024/0356896 A1    Oct. 24, 2024

Related U.S. Application Data

(63) Continuation of application No. 17/564,927, filed on Dec. 29, 2021, now Pat. No. 12,034,698.
(Continued)

(51) Int. Cl.
*H04L 9/40* (2022.01)

(52) U.S. Cl.
CPC ...... *H04L 63/0236* (2013.01); *H04L 63/1416* (2013.01); *H04L 63/1425* (2013.01); *H04L 63/1441* (2013.01)

(58) Field of Classification Search
CPC ............ H04L 63/0236; H04L 63/1416; H04L 63/1425; H04L 63/1441; H04L 67/10; H04L 63/14
See application file for complete search history.

(56) References Cited

U.S. PATENT DOCUMENTS

2004/0268147 A1   12/2004  Wiederin
2012/0324528 A1*  12/2012  Ferracane ............... H04L 63/20
                                                              726/1
(Continued)

FOREIGN PATENT DOCUMENTS

WO    WO-2019195817    10/2019

OTHER PUBLICATIONS

International Preliminary Report on Patentability, dated Jul. 13, 2023, Int'l Appl. No. PCT/US2021/065506, Int'l Filing Date Dec. 29, 2021; 10 pgs.
(Continued)

*Primary Examiner* — Abiy Getachew

(57) ABSTRACT

Examples of the present disclosure describe systems and methods for providing enhanced security in edge computing environments. A first aspect describes a method for moving security features dynamically applied to an application at a first deployment location to an application at a second deployment location. A second aspect describes a method for locally expanding/contracting an instance of a deployed application. A third aspect describes a method for redirected network traffic associated with detected malicious conduct from a first application deployment environment to a secured second application deployment environment. A fourth aspect describes a method for performing multi-stage network traffic filtering.

16 Claims, 7 Drawing Sheets

Related U.S. Application Data

(60) Provisional application No. 63/132,166, filed on Dec. 30, 2020.

(56) References Cited

U.S. PATENT DOCUMENTS

| | | |
|---|---|---|
| 2015/0358358 A1 | 12/2015 | Karhade |
| 2016/0006755 A1* | 1/2016 | Donnelly ............... H04L 63/18 726/1 |
| 2020/0274902 A1* | 8/2020 | Gopal ................. H04L 63/0209 |
| 2021/0059011 A1* | 2/2021 | Fang ..................... H04W 80/02 |
| 2021/0314353 A1* | 10/2021 | Melson .................. H04L 67/02 |
| 2022/0210124 A1 | 6/2022 | Smith |
| 2023/0016364 A1 | 1/2023 | Agarwal |

OTHER PUBLICATIONS

International Search Report and Written Opinion of the International Searching Authority, dated Apr. 8, 2022, Int'l Appl. No. PCT/US21/065505, Int'l Filing Date Dec. 29, 2021; 12 pgs.

* cited by examiner

SYSTEMS AND METHODS FOR PROVIDING ENHANCED SECURITY IN EDGE COMPUTING ENVIRONMENTS

BACKGROUND

Edge computing is a distributed computing paradigm in which information processing and data storage is geographically and/or logically located close to the "edge" of a network (e.g., where users and devices consume the information), rather than relying of a centralized location that may be geographically or logically remote from the edge. Generally, edge computing improves response times and saves bandwidth for data requests. Additionally, edge computing may provide cost savings by locally processing (at the edge) a data request, thereby reducing the amount of data that must be processed in more expensive centralized or cloud-based locations. Despite the various advantages of edge computing, edge environments may be severely impacted by malicious conduct, such as cyberattacks.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for moving security features dynamically applied to an application at a first deployment location to an application at a second deployment location. In aspects, a first instance of an application may be deployed in an edge computing environment associated with a first application deployment location. One or more security features may be dynamically applied to the first instance of the application while the first instance of the application is deployed at the first application deployment location. The security features dynamically applied to the first instance of the application may be determined and a second instance of the application may be instantiated in the second application deployment location. The security features dynamically applied to the first instance of the application may then by applied to the second instance of the application. In some aspects, the first instance of the application may then be made inaccessible, such that the network traffic directed to the first instance of the application is redirected to the second instance of the application. In other aspects, the first instance of the application may remain active and/or accessible, such that network traffic may be received and processed by the first instance of the application and the second instance of the application.

Examples of the present disclosure further describe systems and methods for performing multi-stage network traffic filtering. In aspects, an instance of an application may be deployed in an edge computing environment. The instance of an application may be associated with a network traffic filtering system that is configured to use any one or several components of the edge computing environment to perform filtering for the network traffic received by the application. Upon receiving network traffic directed to the application, the filtering system may evaluate the network traffic to determine whether the network traffic should be filtered. If it is determined that the network traffic should be filtered, the filtering system may use one or more forms of decision logic to determine which component(s) of the edge computing environment will perform the filtering. The filtering system may then cause the determined component(s) of the edge computing environment to filter the network traffic. In aspects, performance data for the edge computing environment may also be evaluated and, based on that evaluation, a second component of the edge computing environment may be selected to begin filtering of the network traffic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
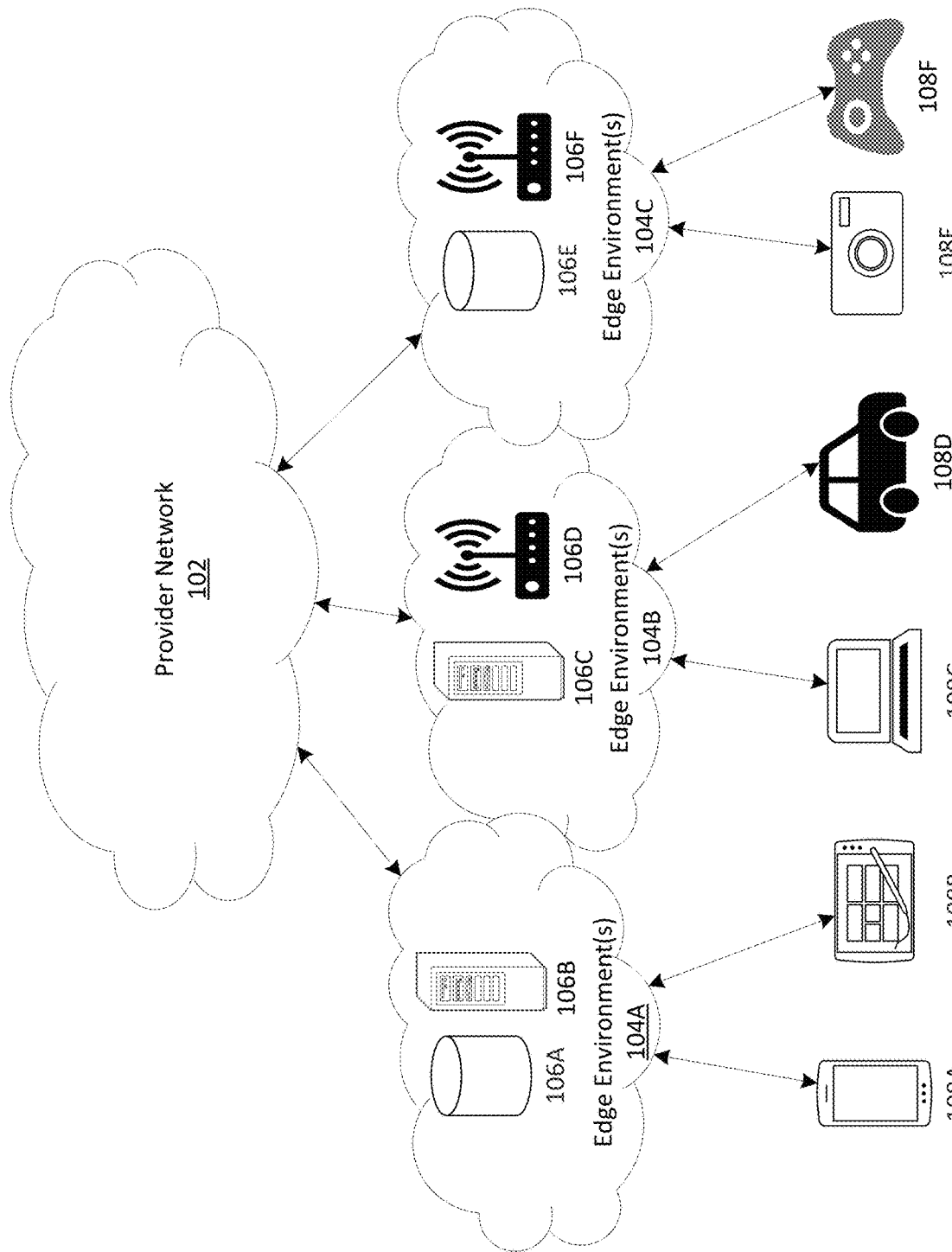
FIG. 1 illustrates an example system for providing enhanced security in edge computing environments.

In many network-based computing solutions, the processing and storage of data occurs at centralized locations that may be geographically or logically remote from the devices and applications that will ultimately consume the data. Edge computing was developed to address (among other things) the exponential growth of Internet of Things (IoT) devices, which contribute to the data processing and storage loads at these centralized locations. Edge computing moves at least a portion of the data processing and data storage from the centralized locations to locations geographically and/or logically closer to the consuming devices and applications ("edge locations"). This movement of data processing and data storage to edge locations mitigates data latency issues that can affect application performance and user experience, especially where real-time data is used/expected. This movement of data processing and data storage to edge locations also reduces the bandwidth costs for data, which can be based on the distance the data must travel from the consuming devices and applications to the data processing and storage location.

Edge locations may comprise functionality and services for performing one or more tasks. For example, instances of one or more applications may be instantiated at one or more edge locations. The applications may process data requests from various users and user devices. Generally, security information (security policies, configuration settings, etc.) may be applied to each application instance. The security information may include "static" security information and "dynamic" security information. The static security information may be applied to applications when the applications are instantiated at or deployed to their respective edge locations. For example, each application may be instantiated/deployed using a default security configuration. The default security configuration may define a set of security options that will be applied to each application or application type. Alternately, the static security information may be provided to the applications after the applications are instantiated at or deployed to their respective edge location. For example, a centralized, cloud-based environment may provide periodic security updates to applications in various edge locations. The periodic security updates may be generally applicable to several (or all) applications in the various edge locations. In either scenario, each instance of the application or application type may comprise the same default security configuration.

The dynamic security information may be applied to a single application after the application is instantiated at or deployed to an edge location. The dynamic security information may define a set of security options that are configured for a specific application, an instance of an application, or an application type. For example, a first instance and a second instance of an application may be deployed to one or more edge locations. In response to a detected cyberattack that is targeting the first instance of the application, one or more IP addresses, device traffic associated with it some unique or dynamically derived identifier or other methods for the attacking devices may be blocked dynamically by the first instance of the application. Additionally, security protections for the specific type of cyberattack detected may be assigned dynamically to the first instance of the application. As the security applied to the first instance of the application is not automatically applied to the second instance of the application, the dynamic security information represents the current security state of the first instance of the application. Notably, conventional security procedures for edge computing environments do not enable the dynamic security information for a first instance of an application to be dynamically and automatically applied to a second instance of an application. As a result, the dynamic security information for many applications is often not applied to new instances of the application, which leaves the new instance vulnerable to known and previously attempted attacks.

To address such issues in edge computing environments, the present disclosure provides various systems and methods for translocating the current security state of a first application instance to a second application instance. In aspects, an application (or an instance thereof) may be modified. For example, an instance of an application may be moved or copied from a first edge location to a second edge location. Alternately, an application may be expanded or contracted at an edge location, such that one or more instances of the application may be deployed or removed. Such modifications to an application may be performed in response to, for example, modifications of user behavioral patterns, modifications of user location and/or user population, detection of cyberattacks or malicious conduct, detection of modified resource utilization, modifications to application features or process flow, business growth or relocation, etc. When such modifications occur, the dynamic security information (and/or static security information) may be applied to the new instance of the application. For example, the dynamic security information may be retrieved from the first instance or from a repository to which the dynamic security information from the first instance has been copied. The retrieved dynamic security information may then be applied to the new instance such that the first instance and the new instance share the same (or substantially similar) dynamic security information. Thus, the dynamic security information (and/or static security information) of an existing instance of an application is automatically applied to a new instance of the application when the new instance is deployed.

In some aspects, the edge devices and/or applications located at the edge locations may be configured with active security measures for detected anomalies. For example, an edge device that is providing access to an application may be configured to monitor/evaluate network traffic directed to the application. Upon detecting a suspected cyberattack or other malicious conduct directed at the application, the edge device or application may cause the suspicious network traffic to be redirected to a secondary computing environment. The secondary computing environment may be secure and configured to resist and/or monitor the network traffic. The secondary computing environment may comprise a second instance of the application. Alternately, an instance of the application may be deployed to the secondary computing environment upon detection of the suspicious network traffic. Upon (or prior to) redirecting the suspicious network traffic to the secondary computing environment, the dynamic security information for the application may be applied to the instance of the application that is deployed in the secondary computing environment. Thus, the security state of the instance deployed in the secondary computing environment may be the same (or substantially similar to) the security state of the application deployed on the edge device when the suspicious network traffic is redirected.

As another example of the active security measures for detected anomalies, the edge device may comprise a multi-stage network traffic filtering mechanism. The filtering mechanism may be configured to use various components accessible to the edge computing environment to perform filtering for the network traffic received by an application. Upon receiving network traffic directed to the application, the filtering mechanism may evaluate the network traffic to determine whether the network traffic should be filtered. If it is determined that the network traffic should be filtered, the filtering mechanism may use one or more forms of decision logic to determine which component(s) of the edge computing environment will perform the filtering. For instance, the filtering mechanism may use security policies registered by various components of an edge computing environment to determine whether the network traffic should be filtered at the hardware or software level.

Accordingly, the present disclosure provides a plurality of technical benefits including but not limited to: dynamically and automatically determining and applying the current security state of a first application to a second application, dynamically and automatically expanding/contracting an instance of a deployed application in an edge computing environment, dynamically redirected malicious entities to a secured second application deployment environment, and performing multi-stage network traffic filtering in an edge computing environment, among others.

Figure 7:
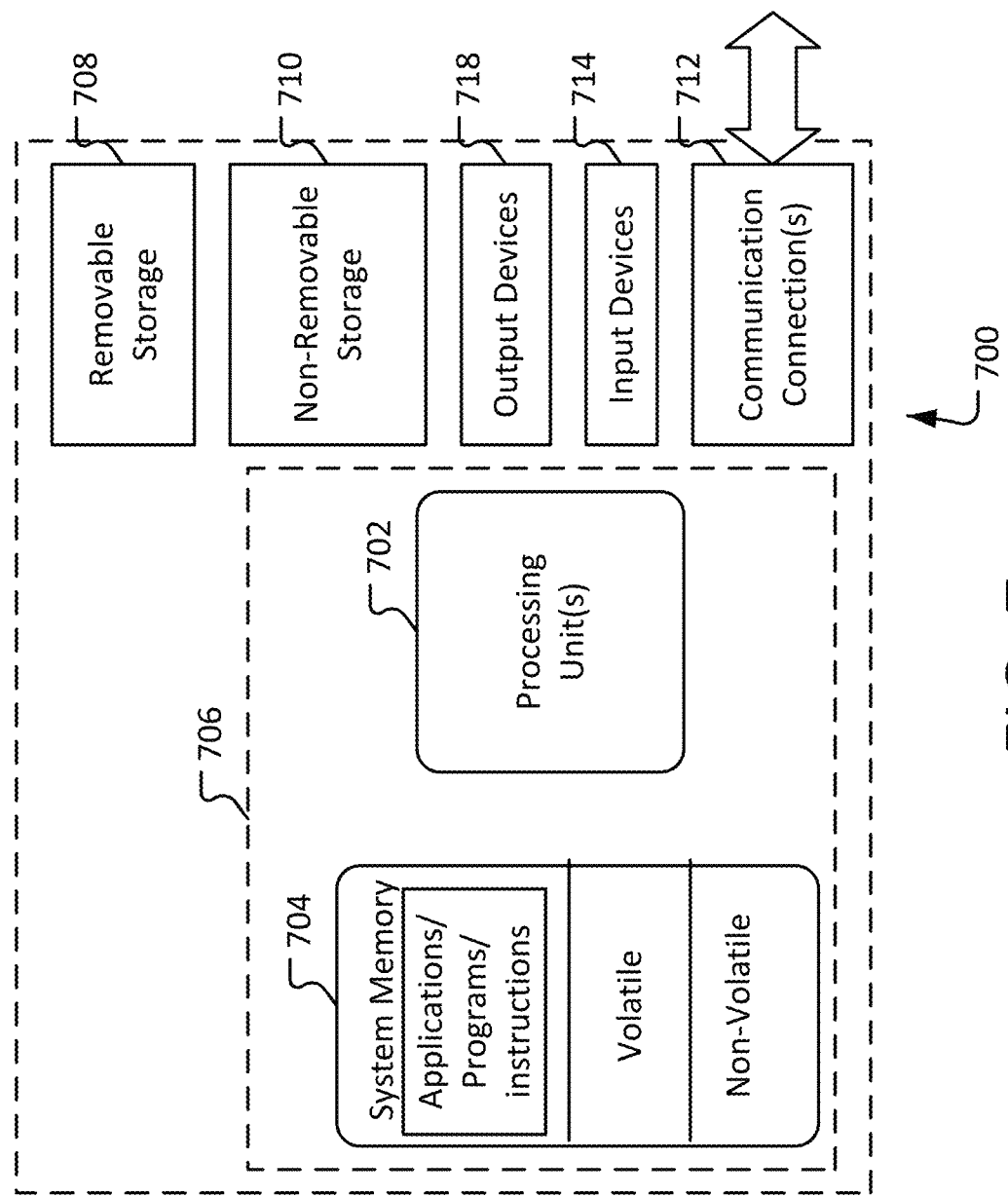
FIG. 7 illustrates one example of a suitable operating environment in which one or more of the present embodiments may be implemented.

FIG. 1 illustrates an overview of an example system for moving security features dynamically applied to an application at a first deployment location to an application at a second deployment location. Example system 100 as presented is a combination of interdependent components that interact to form an integrated system. Components of system 100 may be hardware components or software components implemented on and/or executed by hardware components of the system. System 100 may provide an operating environment for software components to execute according to operating constraints, resources, and facilities of system 100. In one example, the operating environment and/or software components may be provided by a single processing device, as depicted in FIG. 7. In another example, the operating environment and software components of systems may be distributed across multiple devices. For instance, input may be entered on a user device and information may be processed or accessed using other devices in a network, such as one or more network devices and/or server devices.

In FIG. 1, system 100 comprises provider network 102, edge environments 104A, 104B, and 104C (collectively "edge environment(s) 104"), and user devices 108A, 108B, 108C, 108D, and 108E (collectively "user device(s) 108"). One of skill in the art will appreciate that the scale of systems such as system 100 may vary and may include more or fewer components than those described in FIG. 1. For instance, in some examples, the functionality and components of edge environment(s) 104 and provider network 102 may be integrated into a single processing system or environment. Alternately, the functionality and components of edge environment(s) 104 may be distributed across multiple edge environments, user devices, and/or cloud networks.

Provider network 102 may be configured to deliver various computing services (e.g., applications, storage, processing power) over one or more networks, such as the Internet, private networks, Wide Area Networks (WANs), etc. Provider network 102 may comprise numerous hardware and/or software components and may be subject to one or more computing models (e.g., Software as a Service (SaaS), Platform as a Service (PaaS), Infrastructure as a Service (IaaS)). In aspects, provider network 102 may be implemented as part of an edge computing architecture. For example, provider network 102 may provide access to an orchestration mechanism. The orchestration mechanism may be a device, a component thereof, a service, or the like. The orchestration mechanism may provide a user interface that provides access to one or more applications associated with one or more entities. An entity, as used herein, may refer to an organization or company, a person or user, a group, or the like. The user interface may provide user-level (e.g., non-administrator) and/or administrator-level access and privileges to the applications. The application(s) may be accessible to multiple users that are geographically dispersed. To facilitate an improved user experience for the multiple users (e.g., improved response times and decreased bandwidth usage), at least a portion of the computational and data storage requirements of the application may be moved or distributed to locations nearer (geographically and/or logically) to users providing requests to the application, such as edge environment(s) 104.

Edge environment(s) 104 may be configured to deliver various computing services over one or more networks to users of a specific geographical region or area (e.g., country, state, city, neighborhood, building). Edge environment(s) 104 may be established or located in regions or areas that are geographically (and/or logically) near one or more users. For example, a first edge environment may be established in close geographical proximity to a first set of users in a first city and a second edge environment may be established in close geographical proximity to a second set of users in a second city. The first edge environment may provide increased response times for data requests provided by the first set of users, and the second edge environment may provide increased response times for data requests provided by the second set of users. Edge environment(s) 104 may comprise edge nodes 106A, 106B, and 106C, 106D, 106E, and 106F (collectively "edge node(s) 106"). Edge node(s) 106 may provide an entry point into enterprise or service provider core networks, such as provider network 102, or control data flow between two networks. Generally, edge node(s) 106 may be designed to fulfill specific roles and may be configured with applications and/or services to accomplish specific tasks relating to one or more applications provided by provider network 102. Examples of edge node(s) 106 may include server devices, routers, routing switches, integrated access devices, multiplexers, etc.

User device(s) 108 may represent various end user devices and/or internet of things (IoT) devices that are configured to interact with applications/services provided by provider network 102 and/or edge environment(s) 104. For example, user device(s) 108 may provide data requests to and receive result data from one or more applications provided by provider network 102. The response times and/or bandwidth usage for data requests provided by user device(s) 108 may vary depending on the distance between user device(s) 108 and a corresponding edge environment. For instance, the response time for fulfilling a data request may increase and/or the bandwidth usage for the data request may decrease as the distance between user device(s) 108 and an edge environment decreases. As a result, when a first user device is geographically nearer to an edge environment than a second user device, the response time for a data request provided to the edge environment by the first device may be faster than the response time for a data request provided to the edge environment by the second device. Alternately, the response times for data requests provided by all devices within a geographical region may be approximately similar or within a specific range of time. Examples of user device(s) 108 include, but are not limited to, personal computers (PCs), mobile devices (e.g., smartphones, tablets, laptops, personal digital assistants (PDAs)), and wearable devices (e.g., smart watches, smart eyewear, fitness trackers, smart clothing, body-mounted devices. Accordingly, user device(s) 108 may include sensors, applications, and/or services for receiving or collecting input. Example sensor include microphones, touch-based sensors, keyboards, pointing/selection tools, optical/magnetic scanners, accelerometers, magnetometers, gyroscopes, etc. The collected input may include, for example, voice input, touch input, text-based input, gesture input, video input, and/or image input.

Figure 2:
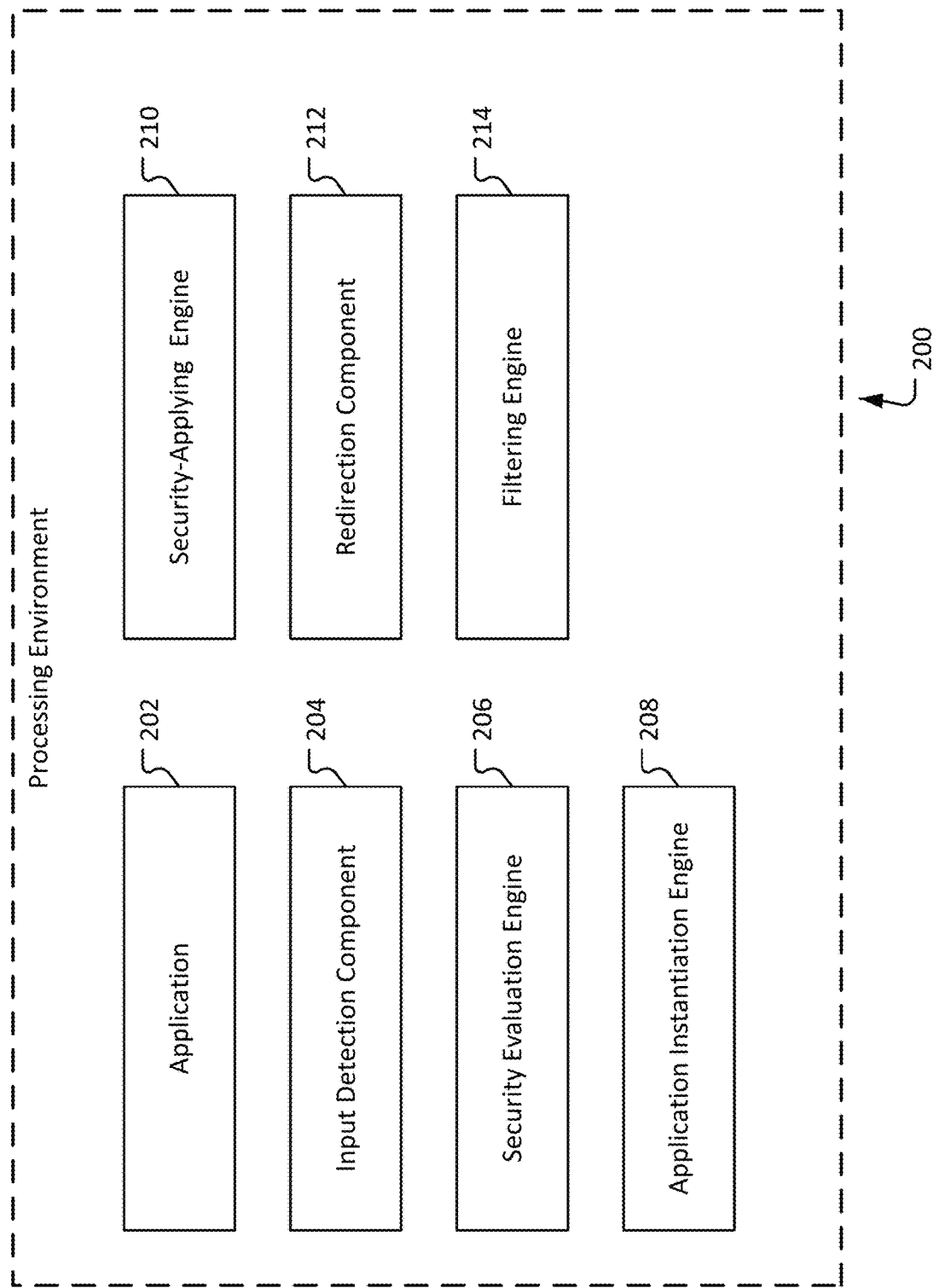
FIG. 2 illustrates an example processing environment for providing enhanced security in edge computing environments.

FIG. 2 illustrates an example processing environment 200 for translocating the current security state of a first application to a second application as described herein. The techniques implemented by processing environment 200 may comprise the techniques and data described in system 100 of FIG. 1. Although examples in FIG. 2 and subsequent figures will be discussed in the context of edge computing environments, it is contemplated that the examples are also applicable to other contexts, such as cloud computing environments. In some examples, one or more components of processing environment 200 (or the functionality thereof) may be distributed across multiple devices. In other examples, a single device may comprise the components of processing environment 200.

In aspects, some or all of processing environment 200 may be implemented in an edge computing environment, such as edge computing environments 104A, 104B, and 104C of FIG. 1. The edge computing environment may be located in close geographic proximity to one or more users or user groups. Processing environment 200 may provide geographically localized applications and/or services for a core network or core computing environment. For example, an application (or an instance thereof) provided by a core network (such as provider network 102 in FIG. 1) may be moved to or instantiated in processing environment 200. As compared to the core network, processing environment 200 may provide improved processing power, data storage, and/or data security for users located near processing environment 200. In FIG. 2, processing environment 200 comprises application(s) 202, input detection component 204, security evaluation engine 206, application instantiation engine 208, security-applying engine 210, redirection component 212, and filtering engine 214. One of skill in the art will appreciate that the scale of processing environment 200 may vary and may include additional or fewer components than those described in FIG. 2.

Application(s) 202 may be one or more application, services, or combinations thereof that are provided by a core network or core computing environment. In some instances, application(s) 202 (or aspects thereof) may be offloaded from a core network or core computing environment to processing environment 200. Examples of application(s) 202 include, but are not limited to, smart manufacturing applications, video analytics applications, point-of-sale (POS) transaction applications, retail robotics applications, AI/ML services and functionality, big data analytics applications, disaster recovery services, data storage services, word processing applications, spreadsheet applications, simulated reality applications (e.g., virtual reality, mixed reality, augmented reality), web browser applications, messaging applications, workflow applications, media player/processing applications, and gaming applications.

Input detection component 204 may be configured to receive and/or detect interaction between application(s) 202 and one or more users, devices, or systems. In some examples, input detection component 204 may be implemented as a background process of an edge computing device (such as edge node(s) 106) of processing environment 200. The background process may monitor data sent/received by application(s) 202 and/or resource utilization parameters of application(s) 202. Examples of resource utilization parameters may include load average, CPU usage, memory usage, swap space usage, page swapping, disk usage, etc. In other examples, input detection component 204 may be implemented as a user interface for interacting with application(s) 202. The user interface may provide user-level (e.g., non-administrator) access and privileges that enable users to review, modify, or otherwise interact with and/or manipulate application(s) 202. Such a user interface may be implemented on an edge computing device comprising application(s) 202. Alternately, the user interface may be implemented on a device at the core network or otherwise external to the edge computing environment comprising application(s) 202. Such a user interface may provide administrator-level access and privileges to application(s) 202. For example, an orchestration device may be located in a computing environment having access to a core network. The orchestration device may provide an administrator user interface that has a global view of the core network and each of the edge computing environments. The administrator user interface may enable users (such as system or network administrators) to move an application (or an instance thereof) from a first deployment location to a second deployment location, instantiate a new instance of an application in one or more deployment locations, remove an instance of an application from a deployment location, add/remove security features to/from an application, etc. In either implementation scenario, input detection component 204 may receive or detect a request or instruction to move, copy, or instantiate an application. The request/instruction may be identified by evaluating one or more resource utilization parameters and/or user interface input. The evaluation may include the use of one or more data comparison techniques, such as pattern matching, regular expressions, fuzzy matching, threshold analysis, etc.

Security evaluation engine 206 may be configured to identify security features applied to an application (or an instance thereof). In examples, security evaluation engine 206 may be invoked in response to input received or detected by input detection component 204. For example, when a request or instruction to move, copy, or instantiate an application is received or detected, security evaluation engine 206 may be invoked. Invoking security evaluation engine 206 may include providing an instruction/command and one or more parameters to the security evaluation engine 206. At least one of the parameters may identify an application (via an application name or identifier), an application deployment location, and/or one or more security features to be applied to or removed from an application. Example security features include, but are not limited to, application security controls, information security controls, network security controls, endpoint security controls, and internet security controls. Upon being invoked, security evaluation engine 206 may evaluate the security features currently applied to an identified application.

In aspects, the security features of an application may be classified or otherwise arrangeable into at least static security features or dynamic security features. Static security features may refer to security features that are applied to an application when the application is instantiated at or deployed to a deployment location, such as an edge location. The static security features may represent a default security configuration, or a security configuration that is uniformly applied to a group of devices or device types. For example, the static security features may represent a security update that is periodically provided by an antivirus/antimalware provider and is generally applicable to multiple devices. Dynamic security features may refer to security features that are applied to a specific application or application instance. Dynamic security features may be applied to an application while the application is deployed to a deployment location and in response to the detection of network activity for a specific application, such as a cyberattack, a deviation in expected user of network behavior, elevated resource utilization parameters, etc. In examples, the dynamic security features may vary between applications and/or instances of an application based on the deployment location of the application/instance and/or the network activity the application/instance. Accordingly, the dynamic security features represent the current security state of a single application or application instance.

After security evaluation engine 206 has evaluated the security features currently applied to an identified application, security evaluation engine 206 may store the configuration settings for the evaluated security features. For example, security evaluation engine 206 may store the static security features in a first configuration file and store the dynamic security features in a second configuration file. Alternately, the static security features and the dynamic security features may be stored in the same configuration file or data structure. In some aspects, the configuration settings may be stored locally on processing environment 200. In other aspects, at least a portion of the configuration settings may be transmitted to and stored by a centralized data repository that is external to processing environment 200. For example, the configuration settings may be transmitted to a core network or core computing environment that is accessible by the edge devices located in various edge locations.

Application instantiation engine 208 may be configured to add and/or remove an instance of an application to/from a deployment location. In examples, application instantiation engine 208 may receive a request or instruction to add or remove one or more applications (or an instance thereof). The request or instruction may be received from a device at the core network or otherwise external to the edge computing environment. For example, the request or instruction may be transmitted from an administrator user interface of an orchestration device, as described above with respect to input detection component 204. Alternately, the request or instruction may be received from a monitoring process for monitoring resource utilization parameters of application 202. Upon receiving the request or instruction, application instantiation engine 208 may add and/or remove one or more applications accordingly. For example, application instantiation engine 208 may instantiate an application in a first edge location and remove the application from a second edge location. As another example, application instantiation engine 208 may instantiate a second instance of an application in an edge location that comprises a first instance of the application.

Security-applying engine 210 may be configured to apply security features to an application. In some aspects, security-applying engine 210 may be implemented in the location in which application instantiation engine 208 has instantiated a new application instance. In other aspects, security-applying engine 210 may be implemented in a device at the core network or otherwise external to the edge computing environment. In either case, security-applying engine 210 may have access to security features identified by security evaluation engine 206. In one example, security evaluation engine 206 (implemented in the deployment location of the first application instance) may provide the security features of an application to security-applying engine 210 (implemented in the deployment location of the second application instance). Alternately, security evaluation engine 206 may provide a security object (e.g., security token or key, password, or authentication credential) and the location of the security features (e.g., a uniform resource identifier (URI) or hyperlink) to security-applying engine 210. Security-applying engine 210 may then use the security object and the location to retrieve the security features. In a second example, security-applying engine 210 may retrieve the security features from a centralized data repository. The centralized data repository may be located locally to or remotely from security-applying engine 210. For instance, security evaluation engine 206 may be implemented in the deployment location of a new application instance and the centralized data repository may be implemented at a core network.

Security-applying engine 210 may dynamically apply the security features to one or more instances of an application. For example, security-applying engine 210 may apply the dynamic and/or static security features of a first instance of an application to a second instance of the application that has been instantiated by application instantiation engine 208. The dynamic and/or static security features may be applied to the second instance of the application at the time the second instance is instantiated (e.g., in real-time). Alternately, the dynamic and/or static security features may be applied to the second instance of the application after the second instance has been deployed. As a result, the current security state of the second instance of the application may be the same as (or substantially similar to) the current security state of the first instance of the application (e.g., at the time the security features of the first instance were identified by security evaluation engine 206). Further, other instances of the application may exist within system 100 on other edge computing environments. For example, a third instance of the application may be been previously instantiated on a third edge computing environment. The third instance of the application may implement the same static security features as the first and second instances; however, the dynamic security features applied to the third instance may differ because the dynamic performance data of the third instance and/or third edge computing environment may have caused different dynamic security features to be applied to the third instance.

Redirection component 212 may be configured to redirect received network traffic. In aspects, redirection component 212 may have access to network traffic directed to application(s) 202. For example, redirection component 212 may be implemented by a gateway device (e.g., router or firewall) of processing environment 200. The gateway device may provide port forwarding or port mapping services for application(s) 202. In such an example, when the request/instruction is received or detected by input detection component 204 and/or application instantiation engine 208, a command may be sent to redirection component 212. The command may be sent automatically by a component of processing environment 200 or provided manually by a user (e.g., a network administrator). The command may configure the gateway device to redirect at least a portion of the network traffic for application(s) 202 to an alternate destination. For example, based on a user request to move an application from a first edge location to a second edge location, redirection component 212 may redirect the network traffic of the application from the first edge location to the application at the second edge location.

Filtering engine 214 may be configured to filter network traffic. In aspects, filtering engine 214 may comprise logic for determining whether network traffic directed to application(s) 202 should be filtered. The logic may be based on one or more resource utilization parameters of application(s) 202 and/or expected user or network behavior for application(s) 202. For example, upon determining a cyberattack is occurring, filtering engine 214 may determine that network traffic associated with the cyberattack should be filtered. The logic may be incorporated into one or more algorithms or models. A model, as used herein, may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning (ML), a neural network, or the like.

Filtering engine 214 may also comprise logic for determining which component(s) of the edge computing environment, if any, should perform the filtering. The logic may utilize one or more component registration data structures for associating component security capability with security policies. For example, various components of the edge computing (e.g., ethernet switch, network interface card, hypervisor switch, device operating system) may register their respective security capabilities and/or performance costs with a registration utility. A performance cost may indicate a resource utilization and/or financial cost for performing one or more actions. The registration utility may assign or otherwise associate each component to a security policy based on the security capabilities and/or performance costs of the component. The security policy may define, for example, a set of security actions to be performed, criteria for invoking each security action, and/or a component capable of performing the security action. The registration utility and/or filtering engine 214 may monitor the current state (e.g., available capacity or resource load) of the components. When filtering engine 214 determines network traffic directed to an application should be filtered, filtering engine 214 may select a security policy from the registration utility based at least on the resource utilization parameters associated with the network traffic. Filtering engine 214 may select a component to perform the filtering based on the selected security policy, the current state of the components, and/or performance costs of the components. The selected component may then perform the filtering.

Having described various systems that may be employed by the aspects disclosed herein, this disclosure will now describe one or more methods that may be performed by various aspects of the disclosure. In aspects, methods 300-600 may be executed by an example system, such as system 100 of FIG. 1 or processing environment 200 of FIG. 2. However, methods 300-600 is not limited to such examples. In other aspects, methods 300-600 may be performed by a single device. In at least one aspect, methods 300-600 may be performed by one or more components of a distributed network, such as a web service/distributed network service (e.g. cloud service).

Figure 3:
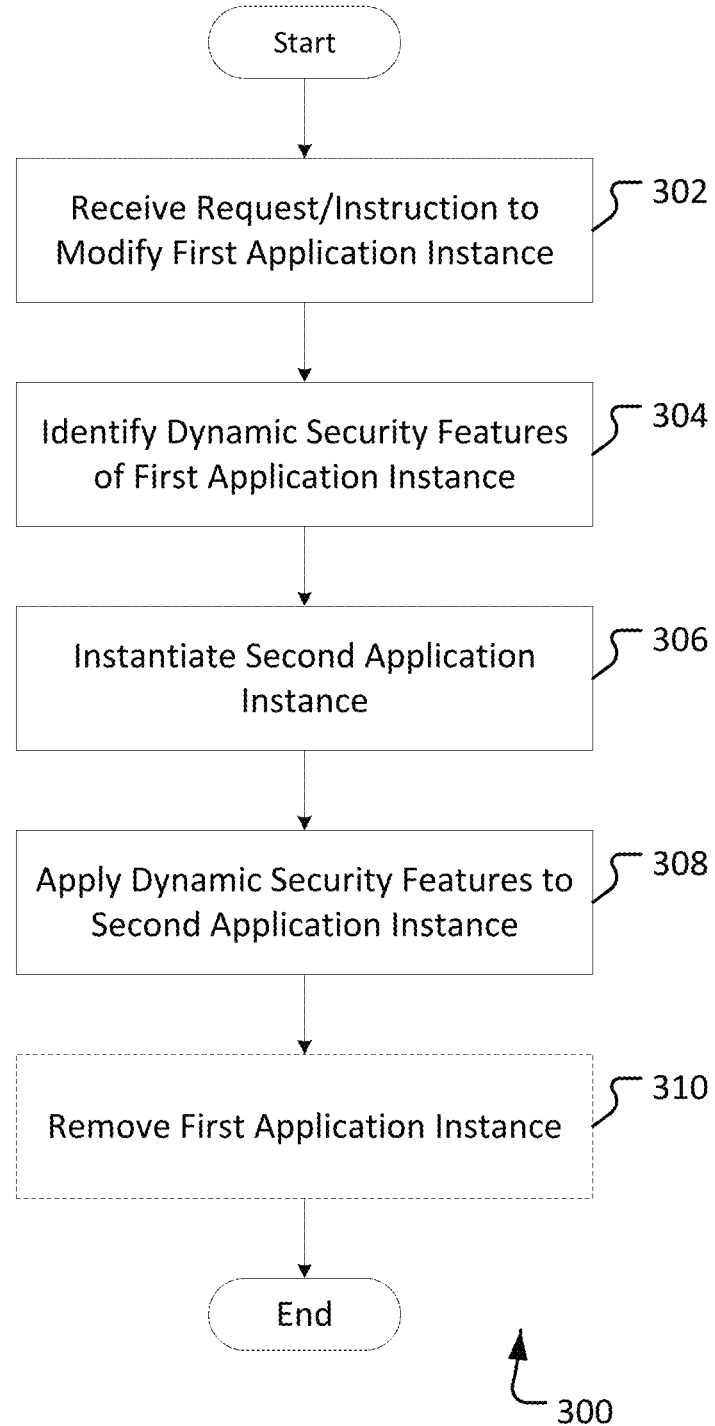
FIG. 3 illustrates an example method for moving security features dynamically applied to an application at a first deployment location to an application at a second deployment location.

FIG. 3 illustrates an example method 300 for moving security features dynamically applied to an application at a first deployment location to an application at a second deployment location. Method 300 may be implemented by one or more devices in edge computing environments and/or devices within a core network. For example, method 300 may be implemented by an edge computing device, such as edge node(s) 106, that is deployed in an edge location, such as edge environment(s) 104. The device (or an alternate device associated with the edge computing environment or core network) may comprise a first instance of an application ("first application instance"), such as application(s) 202. One or more security configurations and/or security features may be applied to the first application instance such that the security configurations/features may be specific to the first application instance.

Method 300 begins at operation 302, where a request or an instruction is received. In aspects, an administrative component associated with the edge computing environment and/or the core network may receive a request/instruction associated with the first application instance. The request/instruction may relate to the modification, relocation, instantiation, or removal of the first application instance or an alternate instance of the application. For example, a user may access an orchestration component of a core network. The orchestration component may provide an administrator utility or administrator services for the first application instance. The user may provide, via one or more interfaces of the orchestration component, a request to move the first application instance from a first edge location in Denver to a second edge location in Seattle. As another example, the edge computing device comprising the first application instance may further comprise a monitoring component, such as input detection component 204. The monitoring component may monitor resource utilization parameters associated with the first application instance. When the monitoring component detects a condition (e.g., a cyberattack, increased network traffic, unexpected network behavior) that causes the monitored resource utilization parameters to exceed an acceptable boundary, the monitoring component may cause the first application instance to be moved from a first edge location to a second edge location. Alternately, the monitoring component may generate an indication or notification that the first application instance is to be copied from the first edge location to the second edge location.

At operation 304, the security configurations/features dynamically applied to the application ("dynamic security features") may be identified. In aspects, in response to receiving the request/instruction at operation 302, a security evaluation mechanism, such as security evaluation engine 206, may be invoked. The security evaluation mechanism may evaluate the first application instance to identify the dynamic security features applied to the first application instance. The dynamic security features may represent the security features applied to the first application instance in response to the detection of suspicious or unexpected network activity associated with the first application instance. Examples of dynamic security features include, but are not limited to, DDOS mitigation features (e.g., challenge-response authentication, data inspection, white-listed and/or black-listed IP addresses), firewall analysis features (e.g., packet inspection, network level traffic blocking/pass-through, application-level network traffic blocking/pass-through), user analysis features (e.g., historical user behavior analysis, user aliases or known associates, allow-list and/or deny-list of users, accounts, and roles), and data loss prevention features (e.g., TCP stream/payload analysis, security decision analysis). For example, in response to detecting that a first instance of the application is experiencing a cyberattack, one or more IP addresses or traffic uniquely associated with the attacking devices may be dynamically blocked and security protections for the specific type of cyberattack detected may be applied to the first instance of the application. These security measures may be identified as dynamic security features of the first instance of the application.

To identify the dynamic security features, the security evaluation mechanism may evaluate one or more current security configuration files/settings of the first application instance and/or previously applied security configuration files/settings of the first application instance. The evaluation may include the use of one or more search utilities, disk imaging/cloning utilities, or the like. Alternately, the security evaluation mechanism may execute a command or set of instructions that queries the first application instance for a current security state or one or more historical security states. The security evaluation mechanism may store the identified dynamic security features in one or more storage locations (e.g., local memory of the edge device, local memory of a core network device, a configuration file of the edge device or core network device, a central repository for the edge computing environment). In examples, the dynamic security features may be periodically evaluated and stored within the core network so that, if the first edge environment fails and a second application instance at the second edge environment needs to be instantiated without access to the first edge environment, recent dynamic security features may be used.

In some aspects, the security evaluation mechanism may further evaluate the first application instance to identify the static security features applied to the first application instance. The static security features may represent a default security configuration, or a security configuration that is uniformly applied to a group of devices or device types. The static security features may be applied to the first application instance without respect to the current to historical network activity associated with the first application instance. The security evaluation mechanism may identify the static security features by evaluating the current and/or previously applied security configuration files/settings of the first application instance. Alternately, the security evaluation mechanism may evaluate a global or default security configuration file/setting provided by a core network or core computing environment associated with the application.

At operation 306, a second instance of the application ("second application instance") may be instantiated. In aspects, based on the request/instruction received at operation 302, an instantiation component, such as application instantiation engine 208, may be invoked. The instantiation component may instantiate a second application instance at a second edge location. The functionality of the second application instance may be the same as (or similar to) the functionality of the first application instance. However, upon instantiation, the second application instance may not comprise the dynamic security features of the first application instance. Instead, the second application instance may comprise only static security features or no security features. In alternate aspects, the instantiation component may move (e.g., copy/paste) the first application instance from the first edge location to the second edge location. Moving the first application instance may comprise suspending network traffic to the first application instance, copying the application and corresponding files (e.g., application files, configuration files, data files) for the first application instance to a data package, transmitting the data package to the second edge location, and pasting/installing the data package in the second edge location. Upon pasting/installing the first application instance in the second edge location, the first application instance may (but need not) comprise both the dynamic and/or static security features of the first application instance in the first edge location.

At operation 308, dynamic security features of the first application instance may be applied to the second application instance. In aspects, a security installation mechanism, such as security-applying engine 210, may receive or access the dynamic security features and/or the static security features of the first application instance. The security installation mechanism may apply at least the dynamic security features to the second application instance in real-time (e.g., upon instantiation of the second application instance). In some examples, applying the dynamic security features to the second application instance may comprise uploading or setting a set of configuration options on the second application instance. In other examples, applying the dynamic security features to the second application instance may comprise sequentially applying a series of security updates/features to the second application. In either example, upon applying the dynamic security features (and/or the static security features) of the first application instance to the second application instance, the first application instance and the second application instance will share the same (or substantially similar) security state.

At optional operation 310, the first application instance may be removed. In aspects, after at least the dynamic security features of the first application instance have been applied to the second application instance, the instantiation component may remove or deactivate the first application instance. Network traffic directed to the first application instance may subsequently be redirected to the second application instance by a redirection mechanism, such as redirection component 212. In other examples, the second application instance may be intended as an additional (rather than replacement) instance, in which case both the first application instance and the second application instance may be maintained and utilized to share the load of the application, per normal load-sharing procedures.

Figure 4:
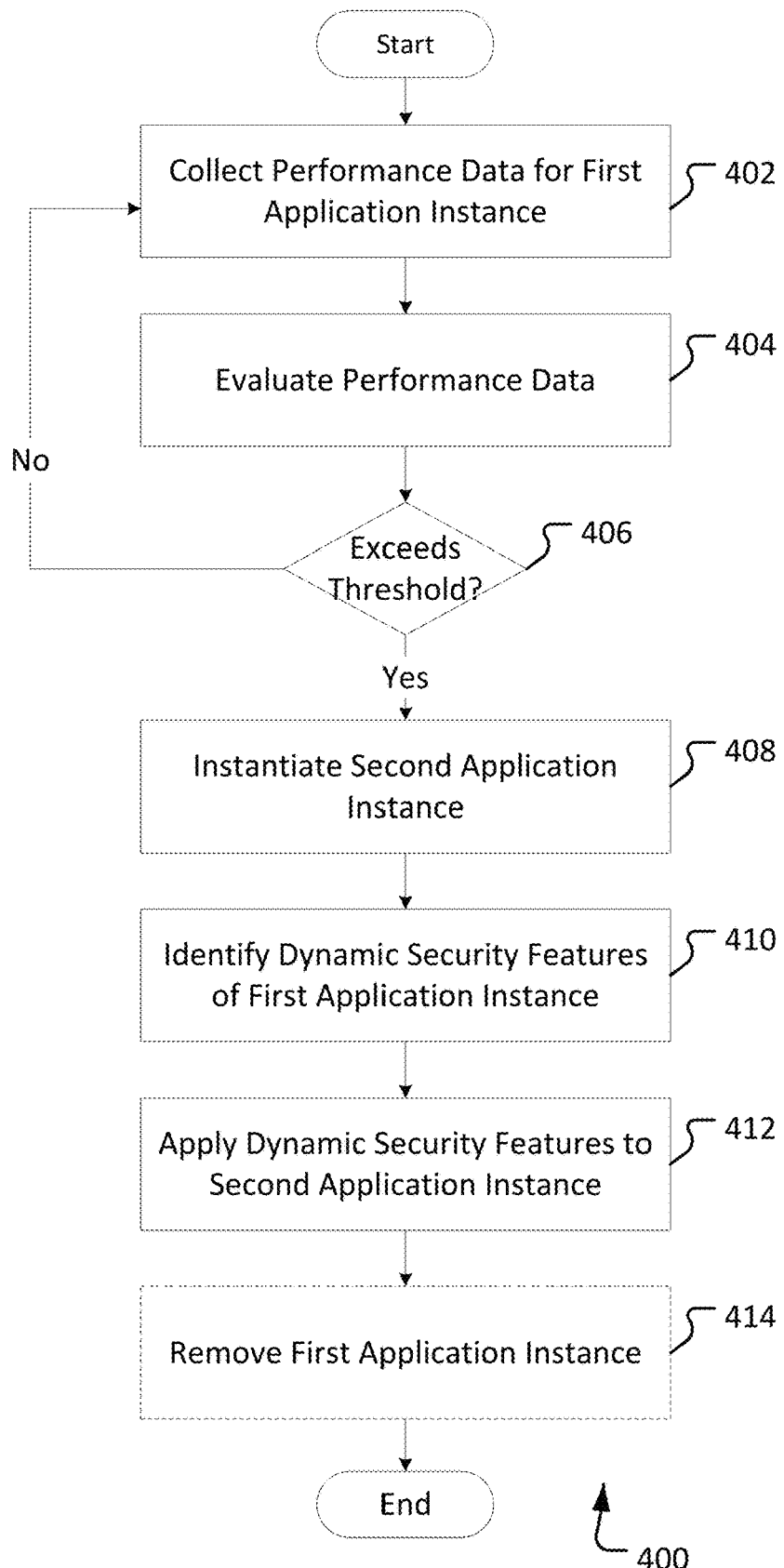
FIG. 4 illustrates an example method for locally expanding/contracting an instance of a deployed application.

FIG. 4 illustrates an example method 400 for locally expanding/contracting an instance of a deployed application. Method 400 may be implemented by one or more devices in an edge computing environment, such as an edge computing device, a user device, or a core network/computing environment. The device may comprise a first instance of an application ("first application instance") that is deployed to a first edge location. One or more security configurations/security features may be applied to the first application instance such that the applied security configurations/features are specific to the first application instance.

Method 400 begins at operation 402, where performance data associated with the first application instance may be collected. In aspects, the device comprising the first application instance may further comprise or be accessible by a monitoring component, such as input detection component 204. The monitoring component may monitor and/or collect performance data for the first application instance, such as network performance data for the network traffic received by the first application instance and/or resource utilization parameters associated with the first application instance. Example network performance data may include the number of network requests received from a source IP address or geographic region, the number of network requests received by one or more network or endpoint devices, network request trends, the system load of one or more devices, and network latency, among others. Examples of resource utilization parameters may include load average, CPU usage, memory usage, swap space usage, page swapping, disk usage, etc.

At operation 404, the performance data for the first application instance may be evaluated. In aspects, the collected performance data may be evaluated using one or more artificial intelligence (AI), machine learning (ML), or other logic mechanisms, such as decision trees, logistic regression, support vector machines (SVM), k-nearest-neighbor (KNN) algorithms, neural networks, Naïve Bayes classifiers, linear regression, k-means clustering, etc. The evaluation may include comparing one or more parameters in the performance data to a threshold value or predefined value. For example, the collected performance data may be provided to a ML model implemented on the device comprising the first application instance. The ML model may parse the performance data to identify a current CPU usage value for the first application instance. The ML model may compare the current CPU usage value with a CPU usage threshold predefined by the first application instance, the device, or the core network/computing environment. The CPU usage threshold may indicate an acceptable or expected CPU usage value range.

At decision operation 406, a decision may be made based on the evaluated performance data. If the evaluation mechanism of operation 404 (or an alternate determination component of the edge computing environment) determines that the performance data does not match or exceed a threshold/predefined value, method 400 returns to operation 402. If, however, the evaluation mechanism (or an alternate determination component of the edge computing environment) determines that the performance data matches or exceeds a threshold/predefined value, method 400 proceeds to operation 408. As used herein, "exceeds" a threshold may comprise a particular measured parameter being determined to be above or below a particular threshold depending on the context.

At operation 408, a second instance of the application ("second application instance") may be instantiated. In aspects, when it is determined that the performance data matches or exceeds a threshold/predefined value, an instantiation component, such as application instantiation engine 208, may be invoked. The instantiation component may instantiate a second application instance at the first edge location. Alternately, the instantiation component may instantiate a second application instance at one or more second edge locations. In some examples, the capabilities of the second application instance may be the same as (or similar to) the capabilities of the first application instance. In other examples, the capabilities of the second application instance may be appreciably different from the capabilities of the first application instance. For instance, the second application instance may comprise significantly higher processing power and additional functionality for processing an increased workload volume. In either example, upon instantiation, the second application instance may not comprise one or more security features of the first application instance. For instance, upon instantiation, the second application instance may not comprise any security features or may comprise only static security features of the first application instance.

At operation 410, a security configuration or set of security features applied to the first application instance may be identified. In aspects, a security evaluation mechanism, such as security evaluation engine 206, may be used to identify the dynamic security features applied to the first application instance. The dynamic security features may represent the security features applied to the first application instance in response to the detection of suspicious or unexpected network activity associated with the first application instance. Alternately, the dynamic security features may represent the security features dynamically applied to the first application instance in response to one or more security decisions made while the first application instance is deployed to an edge location. The security evaluation mechanism may also be used to identify the static security features applied to the first application instance. The static security features may represent a default security configuration, or a security configuration that is uniformly applied to a group of devices or device types. Identifying the dynamic and/or static security features may include evaluating one or more current and/or previously applied security configuration files/settings of the first application instance. The security evaluation mechanism may store the identified dynamic and/or static security features in one or more storage locations.

At operation 412, security features of the first application instance may be applied to the second application instance. In aspects, a security installation mechanism, such as security-applying engine 210, may apply the identified dynamic and/or static security features to the second application instance in real-time (e.g., upon instantiation of the second application instance). Applying the security features to the second application instance may comprise uploading or setting a set of configuration options on the second application instance, sequentially applying a series of security updates/features to the second application, or applying the dynamic and static security features to the second application in a specific order. Upon applying the dynamic and/or the static security features to the second application instance, the first application instance and the second application instance will share the same (or substantially similar) security state. For example, if a one or more IP addresses were previously blocked by the first application instance, the security state of the second application instance will be such that the one or more IP addresses are also blocked by the second application instance.

At optional operation 414, network traffic and/or one or more workloads of the first application instance may be redirected to the second application instance. In aspects, after the security features have been applied to the second application instance, a redirection mechanism, such as redirection component 212, may redirect at least a portion of the network traffic for the first application instance to the second application instance. For instance, if the second application instance is approximately equal in capability to the first application instance, approximately half of the network traffic of the first application instance may be redirected to the second application instance. Alternately, if the capabilities of the second application exceed the capabilities of the first application instance, a larger percentage of the network traffic of the first application instance may be redirected to the second application instance. In some aspects, one or more workloads (or portions thereof) may be moved from the first application instance to the second application instance. For instance, if the capabilities of the second application instance exceed the capabilities of the first application instance, a particularly processor-intensive workload may be moved to the second application instance to leverage the increased processing capabilities of the second application instance.

In aspects, after the security features have been applied to the second application instance, the monitoring component may collect performance data for the first application instance and/or the second application instance. The collected performance data may be evaluated as disclosed with respect to operation 404. If it is subsequently determined that the performance data for the first application instance and/or the second application instance no longer matches or exceeds the threshold/predefined value, a decision may be made to remove at least one of the first application instance or the second application instance. For instance, if the evaluation mechanism of operation 404 determines that the CPU usage of the first application instance no longer exceeds the CPU usage threshold value or has not exceeded the CPU usage threshold value for a specific period of time (e.g., 5 minutes), the instantiation component may remove or deactivate the second application instance.

Figure 5:
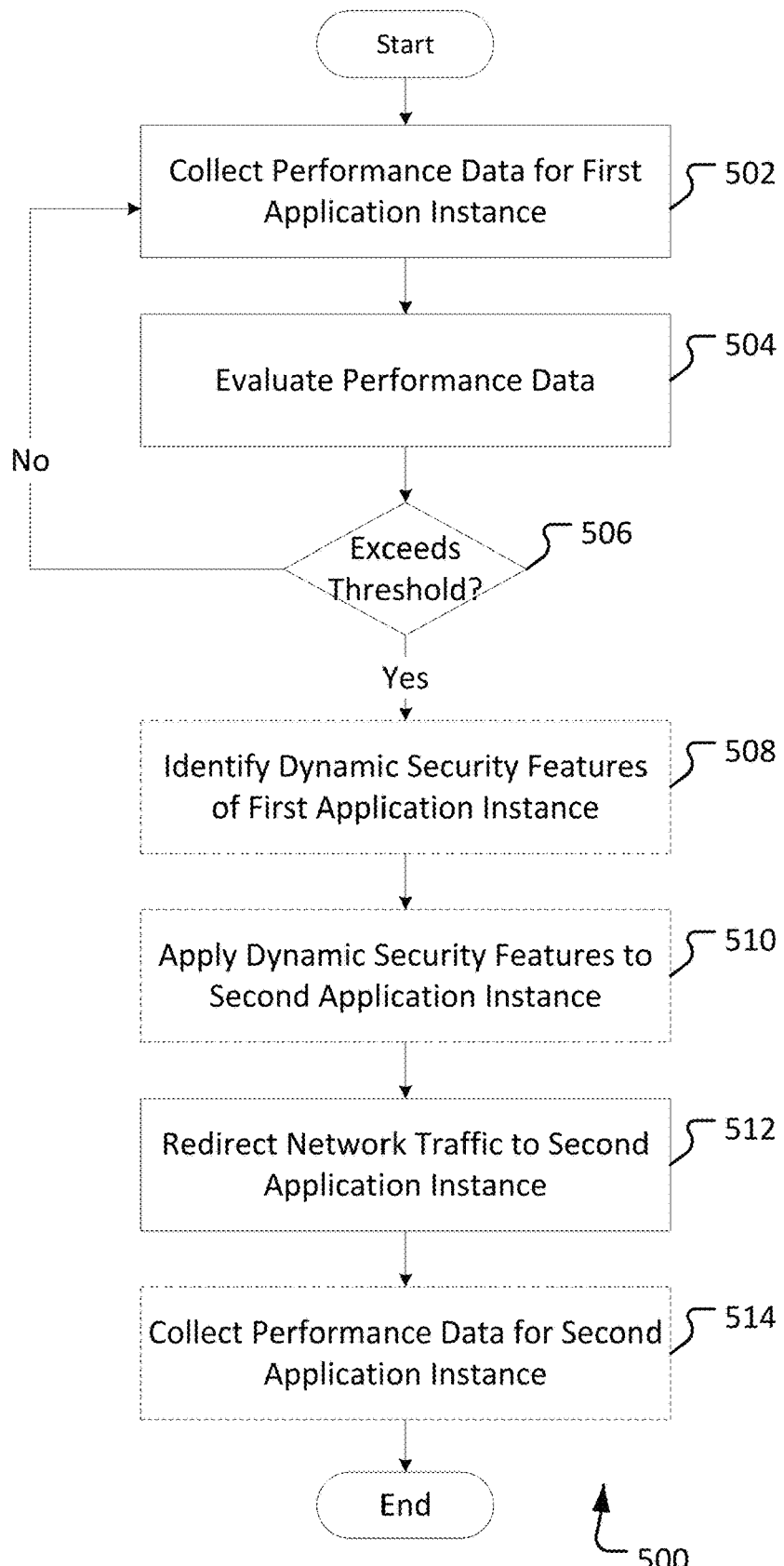
FIG. 5 illustrates an example method for redirected network traffic associated with detected malicious conduct from a first application deployment environment to a secured second application deployment environment.

FIG. 5 illustrates an example method 500 for redirecting network traffic associated with detected malicious conduct from a first application deployment environment to a secured second application deployment environment. Method 500 may be implemented by one or more devices in an edge computing environment (e.g., first application deployment environment), such as an edge computing device, a user device, an IoT device, or a core network/computing environment. The device may comprise a first instance of an application ("first application instance") that is deployed to a first edge location. One or more security configurations/security features may be applied to the first application instance such that the applied security configurations/features are specific to the first application instance.

Method 500 begins at operation 502, where performance data associated with the first application instance may be collected. In aspects, the device comprising the first application instance may further comprise or be accessible by a monitoring component, such as input detection component 204. The monitoring component may monitor and/or collect performance data for the first application instance, such as network performance data for the network traffic received by the first application instance and/or resource utilization parameters associated with the first application instance.

At operation 504, the performance data for the first application instance may be evaluated. In aspects, the collected performance data may be evaluated using one or more artificial intelligence (AI), machine learning (ML), or other logic mechanisms, as disclosed with respect to operation 404 of method 400. The evaluation may include comparing one or more parameters in the performance data to a threshold value or predefined value. For example, the collected performance data may be provided to an AI model implemented on the device comprising the first application instance. The AI model may parse the performance data to identify that the number of network requests received from a source IP address has increased 3000% in the last 15 minutes. Based on this information, the AI model may determine that a cyberattack, such as a DOS attack, is occurring.

At decision operation 506, a decision may be made based on the evaluated performance data. If the evaluation mechanism of operation 504 (or an alternate determination component of the edge computing environment) determines that the performance data does not exceed a threshold/predefined value or is unlikely to be indicative of malicious behavior, method 500 returns to operation 502. If, however, the evaluation mechanism (or an alternate determination component of the edge computing environment) determines that the performance data matches or exceeds a threshold/predefined value or is likely to be indicative of malicious behavior, method 500 proceeds to operation 508.

At optional operation 508, a security configuration or set of security features applied to the first application instance may be identified. In aspects, a security evaluation mechanism, such as security evaluation engine 206, may be used to identify the dynamic and/or static security features applied to the first application instance. The dynamic security features may represent the security features applied to the first application instance in response to the detection of suspicious or unexpected network activity associated with the first application instance. Alternately, the dynamic security features may represent the security features dynamically applied to the first application instance in response to one or more security decisions made while the first application instance is deployed to an edge location. The security evaluation mechanism may also be used to identify the static security features applied to the first application instance. The static security features may represent a default security configuration, or a security configuration that is uniformly applied to a group of devices or device types. Identifying the dynamic and/or static security features may include evaluating one or more current and/or previously applied security configuration files/settings of the first application instance.

At optional operation 510, security features of the first application instance may be applied to the second application instance. In aspects, a security installation mechanism, such as security-applying engine 210, may apply the identified dynamic and/or static security features to a secured computing environment (e.g., second application deployment environment). The secured computing environment may provide a security mechanism for executing untested or untrusted programs or code without risking harm to the host device or operating system. For example, programs or code from unverified or untrusted entities (e.g., third parties, suppliers, users, or websites) may be executed in the secured computing environment to monitor the programs or code for unintended or undesirable effects. To mitigate system failure and/or prevent software vulnerabilities from spreading, the secured computing environment may provide a set of tightly controlled resources for program or code execution. Further, the secured computing environment may prevent or restrict unverified or untrusted entities from inspecting the secured computing environment.

In aspects, the secured computing environment may comprise a preexisting second instance of the application ("second application instance"). Alternately, the second application instance may be instantiated by an instantiation component, such as application instantiation engine 208, after the security features of the first application instance have been identified. In either case, a security installation mechanism, such as security-applying engine 210, may apply the identified dynamic and/or static security features of the first application instance to the second application instance in real-time.

At operation 512, network traffic of the first application instance may be redirected to the second application instance. In aspects, after the security features have been applied to the second application instance, a redirection mechanism, such as redirection component 212, may redirect at least a portion of the network traffic for the first application instance to the second application instance in the secured computing environment. The network traffic may be redirected to the secured computing environment such that a user or device associated with the network traffic is unaware that the redirection has occurred. For example, the network traffic of an attacker may be redirected from the first application instance to the second application instance without providing a notification or indication of the redirection to the attacker.

At optional operation 514, performance data associated with the second application instance is collected. In aspects, a monitoring component of the secured computing environment may monitor performance data for the second application instance, such as network performance data for the network traffic received by the second application instance and/or resource utilization parameters associated with the second application instance. The performance data for the second application instance may be used to identify the attack vector or methodology of the user or device associated with the network traffic. The knowledge of the identified attack vector or methodology may then be used to implement or identify one or more attack mitigation techniques.

Figure 6:
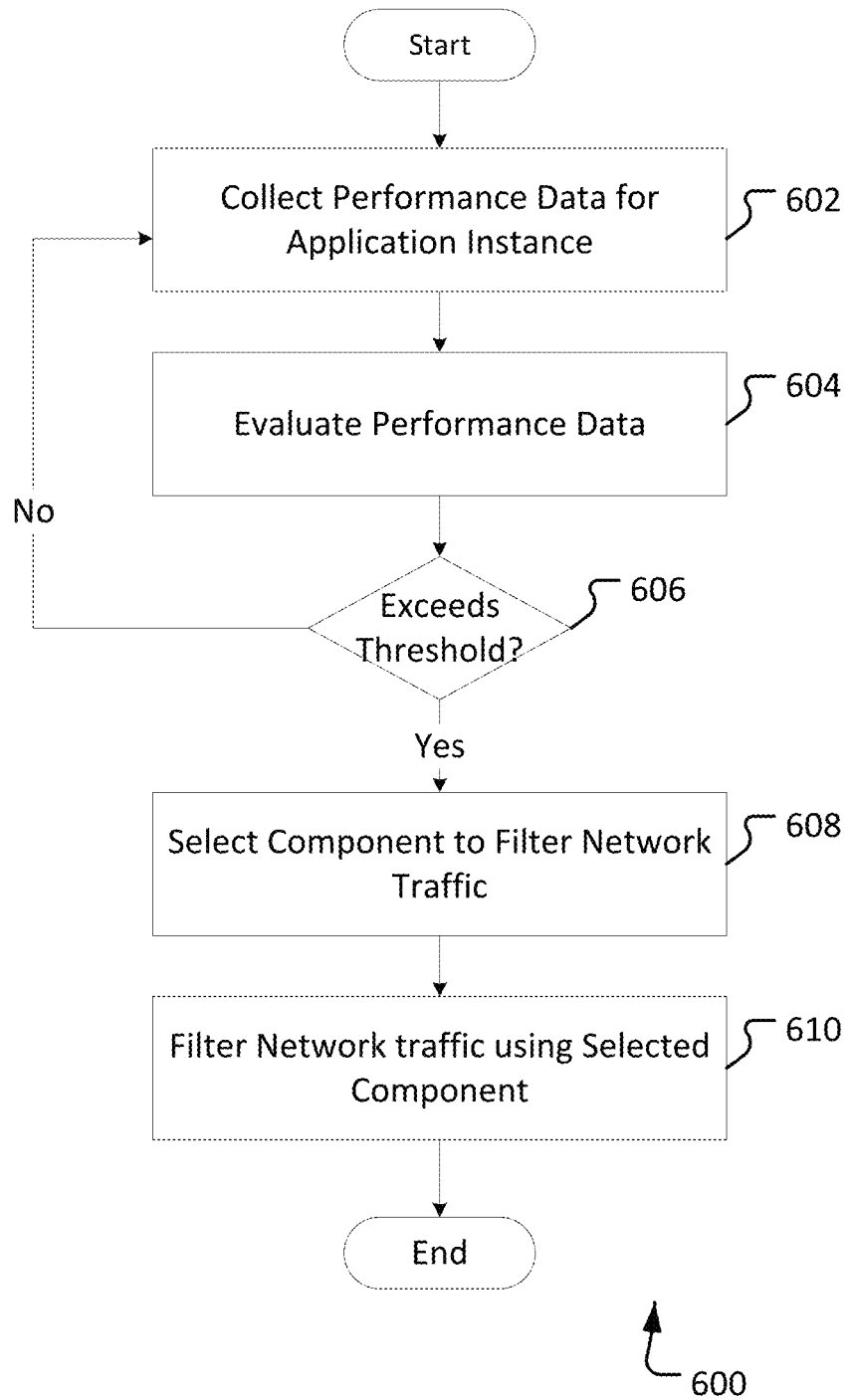
FIG. 6 illustrates an example method for performing multi-stage network traffic filtering.

FIG. 6 illustrates an example method 600 for performing multi-stage network traffic filtering. Method 600 may be implemented by one or more devices in an edge computing environment, such as an edge computing device, a user device, or a core network/computing environment. The device may be implemented in an edge location and may comprise at least one instance of an application ("application instance"). One or more security configurations/security features may be applied to the application instance such that the applied security configurations/features are specific to the application instance.

Method 600 begins at operation 602, where performance data associated with the application instance is collected. In aspects, the device comprising the application instance may further comprise or be accessible by a monitoring component, such as input detection component 204. The monitoring component may monitor and/or collect performance data for the first application instance, such as network performance data for the network traffic received by the application instance and/or resource utilization parameters associated with the application instance.

At operation 604, the performance data for the application instance may be evaluated. In aspects, the collected performance data may be evaluated using one or more artificial intelligence (AI), machine learning (ML), or other logic mechanisms, as disclosed with respect to operation 404 of method 400. The evaluation may include comparing one or more parameters in the performance data to a threshold value or predefined value. For example, a logic ruleset for classifying received network traffic/behavior may be applied the collected performance data. The logic ruleset may identify one or more performance parameters and/or source identifying data objects in the performance data and/or network traffic. Examples of source identifying data objects may include, a user identifier (e.g., username, user identifier, account identifier), a device identifier (e.g., device name, IP address, media access control (MAC) address), originating network/region data (e.g., network trace information, packet header information), etc. The performance parameters and/or source identifying data objects may be compared to one or more thresholds, allow lists, or deny lists. The allow list(s) may comprise a list of entities, user identifiers, device identifier, networks, or the like for which access is approved. The deny list(s), in contrast, may comprise a list of entities, user identifiers, device identifier, networks, or the like for which access is denied or restricted. For instance, an IP address in the network traffic may be evaluated against a deny list of blocked or suspicious IP addresses.

At decision operation 606, a decision may be made based on the evaluated performance data. If the evaluation mechanism of operation 604 (or an alternate determination component of the edge computing environment) determines that the performance data does not exceed a threshold/predefined value or is unlikely to be indicative of malicious behavior, method 600 returns to operation 602. For example, if the IP address associated with a specific amount of network traffic is not found in a deny list, the network traffic may not be filtered. If, however, the evaluation mechanism (or an alternate determination component of the edge computing environment) determines that the performance data matches or exceeds a threshold/predefined value or is likely to be indicative of malicious behavior, method 600 proceeds to operation 608.

At operation 608, a component for filtering the received network traffic may be selected. In aspects, one or more components of the device and/or the edge computing environment may be registered with a component registration service/utility. The component registration service/utility may be implemented locally on the device or accessed remotely by the device. To register with the component registration service/utility, components may respectively provide information to the component registration service/utility, such as enabled features/functionality, available capacity (e.g., processing capacity, storage capacity, workload capacity), security capabilities, action/event performance costs, applicable restrictions or usage information (e.g., service or license agreements), etc. Based on the registration information provided by the components, the component registration service/utility may assign or otherwise associate each component to a security policy. A security policy may define a set of security actions to be performed, criteria for invoking each security action, and/or a component capable of performing the security action.

In aspects, the evaluated performance data may be provided to (or otherwise used to search) a component selection mechanism, such as filtering engine 214. The component selection mechanism may use the evaluated performance data to select one or more applicable security policies from the component registration service/utility. For example, evaluated performance data may indicate that the application instance is currently receiving network traffic that is indicative of a specific cyberattack, such as a SYN flood. The component selection mechanism may parse the evaluated performance data to identify terms or other content indicating the SYN flood attack. In response to identifying the SYN flood attack, the component selection mechanism may search the component registration service/utility for relevant security policies using one or more pattern matching techniques (e.g., regular expressions, wild cards, context-free grammar). For instance, the component registration service/utility may comprise a first security policy indicating that the network interface card is able to filter SYN flood attack for a first cost (e.g., per megabyte (MB)) and a second security policy indicating that the device hypervisor is able to filter SYN flood attack for a second cost that is higher (more expensive) per MB than the first cost. As a result, the component selection mechanism may select the network interface card. The selection may comprise sending a notification, command, or set of instructions to the network interface card that specifies the task to be performed and/or relevant details (e.g., attacking IP address(es), attack type, type of filtering requested, duration of filtering, redirection IP address).

At operation 610, the selected component may filter the received network traffic. For instance, continuing from the above example, the selected network interface card may perform packet blocking for an indicated range of IP addresses that are associated with the received network traffic. In some aspects, multiple components may be selected by the component selection mechanism. Each of the multiple components may be selected to filter at least a portion of the network traffic based on the current state of the multiple components. For example, the network interface card and the device hypervisor may be selected to filter an ongoing SYN flood attack. At the time of the selection, the network interface card may be selected to perform the filtering first based on the cost associated with each component. While the network interface card is filtering the network traffic, an event may occur that causes the network interface card resources to exceed an acceptable usage level or become unavailable. As a result, the component selection mechanism may instruct the device hypervisor to begin filtering the network traffic instead of (or in addition to) the network interface card.

FIG. 7 illustrates an exemplary suitable operating environment for the routing scope restriction techniques described herein. In its most basic configuration, operating environment 700 typically includes at least one processing unit 702 and memory 704. Depending on the exact configuration and type of computing device, memory 704 (storing, instructions to perform the techniques disclosed herein) may be volatile (such as RAM), non-volatile (such as ROM, flash memory, etc.), or some combination of the two. This most basic configuration is illustrated in FIG. 7 by dashed line 706. Further, environment 700 may also include storage devices (removable, 708, and/or non-removable, 710) including, but not limited to, magnetic or optical disks or tape. Similarly, environment 700 may also have input device(s) 714 such as keyboard, mouse, pen, voice input, etc. and/or output device(s) 716 such as a display, speakers, printer, etc. Also included in the environment may be one or more communication connections 712, such as LAN, WAN, point to point, etc. In embodiments, the connections may be operable to facility point-to-point communications, connection-oriented communications, connectionless communications, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments are described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

We claim:

1. A method comprising:
   applying static security features to a first instance of an application operating at a first edge computing environment of a system;
   applying first dynamic security features to the first instance of the application, wherein the first dynamic security features are dynamically determined based on dynamic information specific to operation of the first instance of the application at the first edge computing environment;
   instantiating a second instance of the application at a second edge computing environment of the system, including:
   identifying the first dynamic security features; and
   applying the static security features and the first dynamic security features to the second instance of the application at the second edge computing environment; and
   redirecting at least some traffic from the first instance of the application to the second instance of the application; and
   removing the first instance of the application from the first edge computing environment.

2. The method of claim 1, further comprising, prior to instantiating the second instance of the application:
   evaluating performance data related to the first instance of the application or the first edge computing environment; and
   determining that the performance data exceeds a threshold;
   wherein instantiating the second instance of the application is based on determining that the performance data exceeds the threshold.

3. The method of claim 1, wherein the first dynamic security features comprise one or more of: DDOS mitigation features, firewall analysis features, user analysis features, and data loss prevention features.

4. The method of claim 1, wherein applying the first dynamic security features comprises determining that the first instance of the application is experiencing a cyberattack, identifying source-identifying data for attacking devices, dynamically blocking traffic from the attacking devices, and applying security protections for the detected cyberattack, wherein the source-identifying data comprises one or more of:
   user identifying information comprising one or more of a username, user identifier, or account identifier;
   device identifying information comprising one or more of a device name, IP address, or media access control (MAC) address; or
   originating network/region information comprising one or more of network trace information or packet header information.

5. The method of claim 1, further comprising:
   periodically storing the first dynamic security features at a core system storage;
   wherein applying the first dynamic security features to the second instance of the application at the second edge computing environment comprises copying the first dynamic security features from the core system storage.

6. The method of claim 1, wherein the second edge computing environment comprises a secured computing environment that prevents untrusted entities from inspecting the secured computing environment, further comprising:
  identifying an attacker of the first application instance;
  wherein redirecting at least some traffic from the first instance of the application to the second instance of the application comprising redirecting only traffic from the identified attacker.

7. The method of claim 1, wherein applying the first dynamic security features to the second instance of the application at the second edge computing environment comprises:
  determining a first component of the second edge computing environment to perform filtering of the at least some traffic;
  filtering the at least some traffic with the first component;
  monitoring performance data for the second edge computing environment; and
  based on the performance data for the second edge computing environment, causing a second component of the second edge computing environment to begin filtering the at least some traffic.

8. A system, comprising:
  at least one processor; and
  memory, operatively connected to the processor, the memory storing computer executable instructions that, when executed by the at least one processor, cause the system to perform a method, the method comprising:
  applying static security features to a first instance of an application operating at a first edge computing environment of a system;
  applying first dynamic security features to the first instance of the application, wherein the first dynamic security features are dynamically determined based on dynamic information specific to operation of the first instance of the application at the first edge computing environment;
  instantiating a second instance of the application, including:
    identifying the first dynamic security features; and
    applying the static security features and the first dynamic security features to the second instance of the application; and
    redirecting at least some traffic from the first instance of the application to the second instance of the application; and
  removing the first instance of the application from the first edge computing environment.

9. The system of claim 8, wherein the method further comprises, prior to instantiating the second instance of the application:
  evaluating performance data related to the first instance of the application or the first edge computing environment; and
  determining that the performance data exceeds a threshold;
  wherein instantiating the second instance of the application is based on determining that the performance data exceeds the threshold.

10. The system of claim 8, wherein the first dynamic security features comprise one or more of: DDOS mitigation features, firewall analysis features, user analysis features, and data loss prevention features.

11. The system of claim 8, wherein applying the first dynamic security features comprises determining that the first instance of the application is experiencing a cyberattack, identifying source-identifying data for attacking devices, dynamically blocking traffic from the attacking devices, and applying security protections for the detected cyberattack, wherein the source-identifying data comprises one or more of:
  user identifying information comprising one or more of a username, user identifier, or account identifier;
  device identifying information comprising one or more of a device name, IP address, or media access control (MAC) address; or
  originating network/region information comprising one or more of network trace information or packet header information.

12. The system of claim 8, wherein the method further comprises:
  periodically storing the first dynamic security features at a core system storage;
  wherein applying the first dynamic security features to the second instance of the application comprises copying the first dynamic security features from the core system storage.

13. The system of claim 8, wherein instantiating a second instance of the application comprises instantiating the second instance of the application at a second edge computing environment that comprises a secured computing environment that prevents untrusted entities from inspecting the secured computing environment.

14. The system of claim 13, wherein the method further comprises:
  identifying an attacker of the first application instance;
  wherein redirecting at least some traffic from the first instance of the application to the second instance of the application comprising redirecting only traffic from the identified attacker.

15. A method comprising:
  applying static security features to a first instance of an application operating at a first edge computing environment of a system;
  operating the first instance of the application at the first edge computing environment;
  collecting dynamic information relating to operating the first instance of the application at the first edge computing environment;
  applying first dynamic security features to the first instance of the application, wherein the first dynamic security features are dynamically determined based on the collected dynamic information;
  evaluating performance data related to the first instance of the application or the first edge computing environment; and
  determining that the performance data exceeds a threshold;
  instantiating, based on determining that the performance data exceeds the threshold, a second instance of the application at a second edge computing environment of the system, including:
    identifying the first dynamic security features; and
    applying the static security features and the first dynamic security features to the second instance of the application at the second edge computing environment; and
    redirecting at least some traffic from the first instance of the application to the second instance of the application; and
  removing the first instance of the application from the first edge computing environment.

16. The method of claim 15, wherein applying the first dynamic security features comprises determining that the first instance of the application is experiencing a cyberattack, identifying source-identifying data for attacking devices, dynamically blocking traffic from the attacking devices, and applying security protections for the detected cyberattack, wherein the source-identifying data comprises one or more of:

user identifying information comprising one or more of a username, user identifier, or account identifier;

device identifying information comprising one or more of a device name, IP address, or media access control (MAC) address; or originating network/region information comprising one or more of network trace information or packet header information.

\* \* \* \* \*